Figure 1:
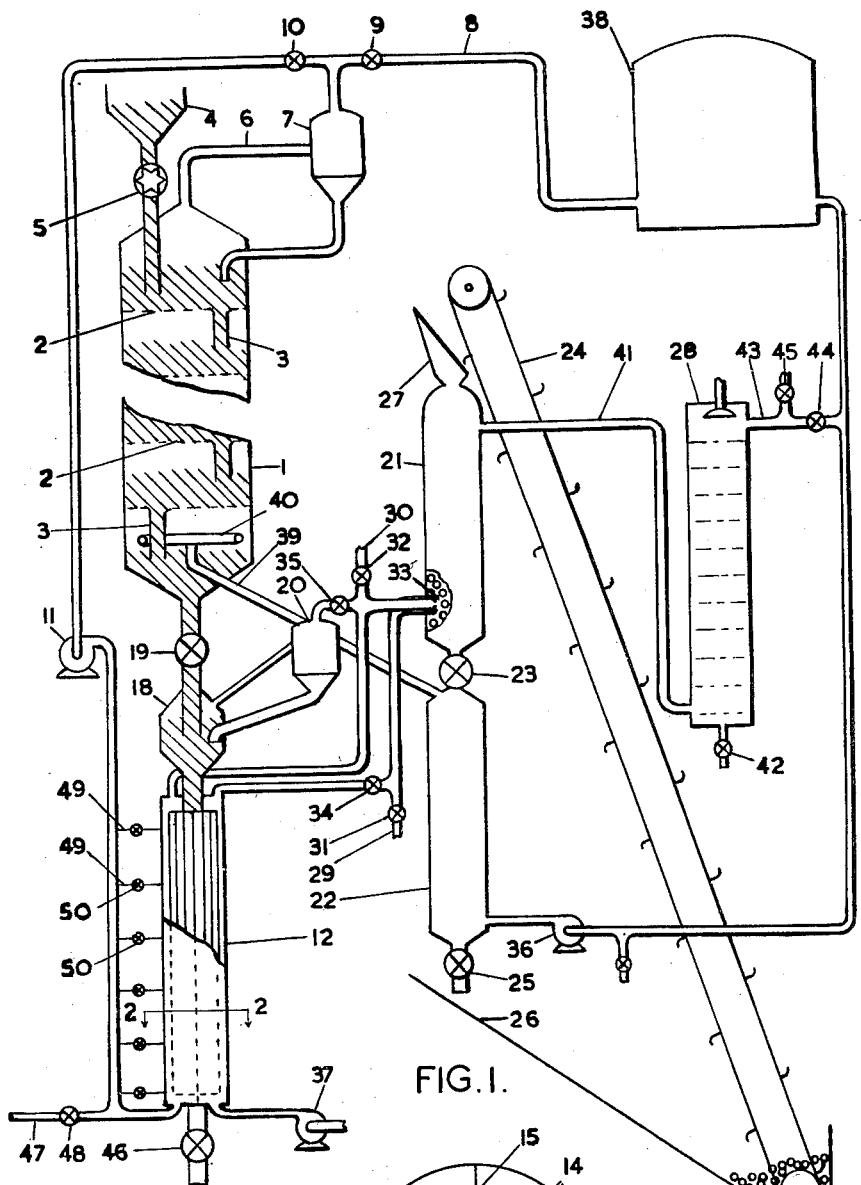

Inventors
W. H. GROOMBRIDGE
W. HUNTER
By
Attorney

_Patented Feb. 19, 1952_                                                          2,586,030

UNITED STATES PATENT OFFICE 2,586,030

MANUFACTURE OF CYANIDES

Walter Henry Groombridge and William Hunter, Spondon, England, assignors to Celanese Corporation of America, a corporation of Delaware Application April 29, 1948, Serial No. 24,074
In Great Britain May 8, 1947

13 Claims. (Cl. 23—82)

This invention relates to the manufacture of chemical products, and more particularly alkali metal cyanides.

The production of sodium cyanide by reaction between sodium carbonate, carbon and nitrogen has been known for many years and is usually referred to as the Bucher process, the reaction being represented by the equation

$$Na_2CO_3 + 4C + N_2 \rightarrow 2NaCN + 3CO - 138.5 \text{ K. cals}$$

The process has been carried out by allowing a mixture of sodium carbonate, carbon, and iron oxide as catalyst to travel slowly through a heated vessel through which is passed a current of nitrogen. It has been found possible to effect high conversions of the sodium carbonate to sodium cyanide, for example when operating in a temperature range above 900° C., e. g. from 950-1000° C., conversions approaching 90% can be obtained. In view of the relative cheapness of the starting materials and the value of the product, sodium cyanide, the possibility of obtaining such high conversions would seem to make the process one which is very attractive as a chemical manufacture. In fact, however, the process has never proved economically valuable because of the large quantity of heat which must be introduced into the reaction and in view of the high temperature at which this heat must be introduced. While useful conversions can be obtained at lower temperatures, e. g. 800 to 900° C., in conventional plant the longer heating time which is necessary to obtain such lower conversions to some extent offsets the advantage gained by their use. Another feature which adds considerably to the expense of the process is the cost of moving the large amounts of solid materials which has to be introduced into and removed from the reactor.

The present invention is concerned with certain features which it has been found possible to introduce into the process in question and which improve the economics of the process substantially, so that at least where the novel features are adopted in their entirety the process becomes a most profitable manufacture.

According to the present invention the carbon monoxide which is produced in the process is burnt with substantially the theoretical amount of air needed and the heat thus produced is introduced into the process. It has been found that considerable advantage is gained by this procedure and that, with careful conservation of heat it is possible under the best conditions to carry on the process continuously, once it has been started, with the supply of very little heat. It has been found particularly advantageous to use the heat produced by burning the carbon monoxide to raise the temperature of the gases entering the reaction zone to above that at which the reaction is carried out. This can be achieved very efficiently by burning the carbon monoxide in a pebble heater used to preheat gases being supplied to the reaction zone. For highest efficiency, the pebble heater should be operated so that the pebbles leave the outlet from the bottom vessel at as low a temperature as possible.

In general, it is preferred to introduce into the reaction zone in a given period a volume of gas which is equal to many times, for instance many more than 10 and preferably from 30-50 times, the volume of nitrogen needed for the cyanide production which takes place during the period. By using a very large volume of inlet gas the heat needed to maintain the reaction can be introduced by preheating the inlet gases to a temperature above that maintained in the reaction zone without, however, having to use exceedingly high temperatures which are both costly to produce as well as involving the use of materials which are much more expensive than those able to withstand somewhat lower temperatures. It is preferred to carry out the reaction in a temperature range of 800 to 1000° C., and to preheat the gases to a temperature some 150 to 200° C. higher than the reaction temperature.

It is not necessary that the whole of the gas introduced into the reaction zone should be nitrogen and, on the contrary, it is advantageous to recycle a mixture of nitrogen and carbon monoxide through the reaction zone, replacing the carbon monoxide made in each passage by equivalent nitrogen. The mixture supplied to the reaction zone should however contain substantially more nitrogen than carbon monoxide, e. g. more than 3 times, and preferably 5 to 20 times, as much nitrogen as carbon monoxide. From the gases issuing from the reaction zone a portion may be separated and passed to a pebble heater in which it is burnt, and the heat produced subsequently re-introduced in to the reaction zone in the recycled portion of the gas mixture to which has been added sufficient nitrogen to replace that used in the reaction and contained in the gas passed to the pebble heater. The combustion products issuing from the pebble heater consist of carbon dioxide and nitrogen, and after absorption therefrom of the carbon dioxide in a suitable medium, the nitrogen can be separated into two streams, one being sufficient to make up that used in the process and the remainder being sent to storage or exhausted to the atmosphere. In such a process the make-up nitrogen may be introduced into the extreme bottom of a pebble heater operated as described above, while the recycled nitrogen-carbon monoxide mixture is introduced at a higher point corresponding with the temperature of the recycled gas.

The solid starting materials consist of the sodium carbonate, carbon and ferric oxide. Although the reaction requires four moles of carbon for each mole of carbonate preferably substantially more than this is used, for instance four to five times the theoretical quantity may be used and if desired 10, 15 or more times the theoretical quantity may be used. Although the ferric oxide is regarded as a catalyst it is preferred to have a substantial quantity present, and a quantity equal in weight to the sodium carbonate has been used with good results while even larger quantities, e. g. two or three times the weight of the sodium carbonate, may be used if desired.

The solid product of the process as it comes from the reaction zone, contains a very considerable quantity of heat which, in accordance with a further feature of the invention, is returned to the process. This heat can be abstracted from the solid by heat exchange with gases used in the process, and it has been found particularly convenient to use the solid to heat up a portion of the gases issuing from the reaction zone before burning the same in a pebble heater, as above described, and also for the purpose of preheating the air to be used in burning this gas. The gas to be burnt may if desired be brought into direct contact with the hot solid product but the air must, of course, be heated indirectly for instance by passage through tubes in contact with the hot solid product. The solid product leaves the reaction zone at a temperature close to the reaction temperature, while the used gas issuing from the reaction zone is at very much below reaction temperature, having given up most of its heat content after leaving the zone where the reaction is taking place in heating up fresh solid starting materials approaching the reaction zone. The air to be used in burning part of the issuing gas mixture is, of course, available at atmospheric temperature. By heat exchange with the hot solid product both the gas to be burnt and the air to be used for the purpose can quite easily be raised to a temperature of 500–800° C., depending upon the amount of gas which has to be preheated and the exact temperatures of the solid and gas coming from the reaction chamber. The gas to be burnt may be introduced into heat exchange relationship with the solid product at a point where the product is at about the same temperature as the gas, and the cold air at a later point in the travel of the solid product so as to cool the latter as far as possible before discharge. In this way, it will be appreciated that all the solids and make-up nitrogen enter the process at about room temperature, while all the products and waste nitrogen and carbon dioxide are removed at the lowest possible temperature, and none of the heat content of the products is wasted. It is by this means that the process can be operated with the supply of but little heat from external sources. Additional heat may be supplied directly to the reaction vessel by any desired external or internal heating means. It is particularly convenient, however, to provide additional heat by adding combustible gas, e. g. carbon monoxide or water gas, to the portion of the gases from the reaction zone which is to be burnt.

A process such as that described above is best carried out with downward travel of the solids against an upward travel of gases. The solids may travel down a vertical reactor or down one which slopes at an angle to the vertical, and the travel of the solids may be simply under the influence of gravity or may be assisted by any mechanical means. Heat exchange between gases and the solid product may be provided for by provision of a heat exchanger quite separate from the reaction vessel and through which the solid product is passed after leaving the reaction vessel or the heat exchanger may form part of the reaction vessel itself.

A particular form of the invention embodying a most important feature is one in which the solids are finely ground and are employed in fluidised form, i. e. in which the particles under the influence of the large quantity of gases which is used with advantage in the process as above indicated remain mobile throughout their travel through the reaction zone and behave rather in the manner of a body of liquid. For the purposes of the process in question it has been found sufficient to employ particles of such a size that with the volume of gases used and the velocity at which they travel, the solids are not actually carried in the gas stream but settle slowly through the reaction vessel rather like a viscous liquid flowing down the vessel and out at an exit placed at or near the bottom. Where gas to be burnt is to be preheated by direct contact with the hot solid product the latter may, by the use of a heat exchanger of suitable dimensions in relation to the rate of gas flow, be maintained in fluidised form by the gas during heat exchange. It is generally desirable in these circumstances to use entirely separate vessels for reaction vessel and heat exchanger. The reaction vessel itself may comprise a number of separate containers through which counter currents of gas and solid pass in series. Alternatively, a single reaction vessel may be divided into compartments by grids permeable to the gases but largely or entirely obstructing the passage of the solids, transfer of solids from one compartment to the next being effected through stand-pipes. Division of the reaction vessel into compartments or separate containers enables heat to be transferred from the gases which have left the actual zone of reaction to fresh solid approaching this zone.

Figure 2:
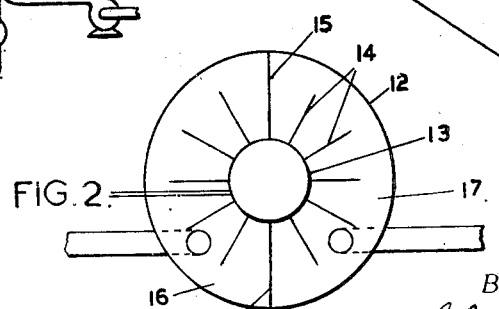

The accompanying drawings show somewhat diagrammatically apparatus suitable for use in carrying out the process of the invention in the manner referred to above. In the drawings Figure 1 shows the general arrangement of the apparatus, and, Figure 2 shows an enlarged view in section of part of the apparatus taken along line 2—2 in Figure 1.

Referring to the drawings, the apparatus shown comprises a reaction vessel 1 separated by perforated partitions 2 into a number of separate compartments, communication between which is provided by the pipes 3 as well as by the perforations in the partitions 2. Supply means for the fresh powdered starting materials comprise the hopper 4, the outlet from which is controlled by star wheel 5. The outlet for gaseous products from the reaction vessel is connected by pipe 6 to centrifugal separator 7 and thence to line 8 controlled by valves 9 and 10. Pump 11 is provided for circulating part of the gases from reaction vessel 1 to the heat exchanger 12 shown more clearly in Figure 2. The heat exchanger 12 comprises a central standpipe 13 provided with fins 14 and separators 15, the latter dividing the chamber surrounding the standpipe 13 into two sections 16 and 17. Standpipe 13 is fed through separator 18 from the reaction vessel 1, control of the feed of fluidised solid being effected by gate valve 19. Centrifugal separator 20 is provided for the separation of particles of fluidised solid from gases issuing from separator 18. Pebble heater composed of upper and lower vessels 21 and 22 with an intermediate connection controlled by gate valve 23 is provided for the generation of heat by combustion of carbon monoxide produced in the process, as more fully described hereinafter, conveyor 24 being provided for transporting pebbles leaving the bottom vessel 22 via the outlet controlled by gate valve 25 and falling to the base of chute 26, whereby the pebbles may be taken again to the top vessel 21, being discharged into the hopper 27 at the top thereof. Scrubbing tower 28 is arranged to receive the exhaust gases from the top vessel 21 of the pebble heater.

In operation, a suitable mixture of carbon, such as coke of low ash content, iron oxide and sodium carbonate is charged into the reaction vessel through hopper 4. A suitable mixture can be made by mixing the moistened ingredients, drying the product and grinding to produce a powder of about 40–60 mesh. Air and carbon monoxide are supplied by lines 29 and 30 controlled by valves 31 and 32 and burnt at burners 33 in the upper vessel 21 of the pebble heater valves 34 and 35 and gate valve 23 being closed during this operation. As soon as the upper vessel 21 of the pebble heater has reached the desired operating temperature, which may be as high as, for example 1800–2000° C., valves 31 and 32 are closed to cut off the supply of air and carbon monoxide and valves 34 and 35 opened and circulating pumps 11, 36 and 37 started. At the same time gate valves 23, 25 are opened sufficiently to permit a slow steady flow of pebbles through the vessels 21, 22, and conveyor 24 started. A nitrogen-carbon monoxide mixture drawn from gas holder 38 is forced through the lower vessel 22 of the pebble heater, leaves the pebble heater by line 39 and enters the reaction vessel 1 by distributor 40. The gases transform the powdered solids contained in the reaction vessel into a fluidised mass which forms a layer on each of the perforated dividers 2 somewhat in the manner of a boiling liquid, the gases travelling upwards in countercurrent and finally leaving the reaction vessel by line 6. Entrained solids are separated in the separator 7 and the gas is thereupon divided into two streams in line 8 by adjustment of valves 9 and 10. Part of the gases passes valve 9 to gas storage vessel 38 from which it is drawn by circulating pump 36 to be passed through the lower vessel 22 of the pebble heater. The remainder of the gases passes valve 10 and is then boosted by pump 11 partly through section 16 of heat exchanger 12 and partly utilised to maintain the fluidised state of the solids passing down standpipe 13, being introduced to the standpipe for this purpose by lines 49 controlled by valves 50. Gases issuing from the separator 18, after passing through the centrifugal separator 20, are taken together with the gas passing through section 16 of the heat exchanger 15 to burner 33, where they meet air supplied by pump 37 and passing through section 17 of heat exchanger 12.

With the opening of gate valves 23, 25, hot pebbles travel to the lower vessel 22 of the pebble heater. In consequence the gas travelling through this vessel becomes heated, the temperature of the circulating gas rising gradually until reaction with the fluidised solids in reaction vessel 1 takes place. During the initial stages of the process it is desirable to enrich the circulating gas with carbon monoxide which may be introduced by line 47 controlled by valve 48. Later the flow of reacted solids through standpipe 13, controlled by gate valves 19, 46 results in preheating of the gas and air passing to the upper vessel 21 of the pebble heater to be burnt, while the gas itself is enriched with carbon monoxide by reason of the reaction taking place in the reaction zone. Accordingly the supply of carbon monoxide by line 47 can be gradually reduced until very little indeed is needed to maintain continuous operation. To this end it is essential that loss of heat should be guarded against by the provision of adequate thermal insulation of the reaction vessel 1, the heat exchanger 12, the pebble heater vessels 21, 22 and all pipe lines through which hot gases pass. The actual temperatures maintained in the different compartments of reaction vessel 1 can be measured by suitably placed pyrometers and the supply of additional carbon monoxide adjusted in accordance with the temperatures registered.

The reaction between the fluidised solids and nitrogen contained in the circulating gas takes place in the compartments toward the bottom of the reaction vessel 1, so that the solids leave the reaction chamber through damper valve 19 at the reaction temperature or even somewhat above this, being heated by incoming fresh gas to a temperature which may be as high as 900°–1000° C. or more. During their passage upwards through the upper compartments of reaction vessel 1 the reacted gases give up the major part of their heat to the descending solids, which thus reach the compartments in which reaction takes place at a suitable temperature, being themselves thus cooled sufficiently for them to be passed directly into line 8. If desired, the gases passing through valve 9 may be cooled further by heat exchange with the air being fed by pump 37 to heat exchanger 12. Reacted gas passing through valve 10, as above indicated, reaches the burner 33 in the upper vessel 21 of the pebble heater via the standpipe 13 or section 16 of the heat exchanger 15. The combustion products leave the top vessel 21 of the pebble heater by line 41 and are taken to scrubber 28, where they are washed free from carbon dioxide and the washings exhausted through line 42, the gases issuing from scrubber 28 by pipe 43 consisting largely of nitrogen, part of which is returned to the system through valve 44 and the remainder exhausted through valve 45.

The apparatus described enables high conversions to be obtained within a fairly wide range of temperature while at the same time the lower temperatures in the range do not necessitate inconveniently long reaction times or substantial additional labour costs. Thus, with reaction temperatures above 900° C., e. g. 900–1000° C., conversions of about 90% can be obtained, while even at lower temperatures, e. g. 800°–900° C., conversions in the neighbourhood of 80% can be obtained with the advantage of having available a wider range of suitable constructional material. Good results are obtained when continuously introducing into the reaction zone a solid reaction mixture comprising sodium carbonate together with 4-5 times the theoretical quantity of carbon and a quantity of ferric oxide equal to about twice the weight of the sodium carbonate, and at the same time 30-35 moles of nitrogen per mole of sodium carbonate introduced. As above indicated, this nitrogen is mixed with carbon monoxide and it has been found best to introduce a mixture containing 85-95% of nitrogen. The gases leaving the reaction zone are poorer in nitrogen as a result of the reaction and contain from rather less than 80% to just about 90% of nitrogen. The exact proportions of nitrogen and carbon monoxide in the feed and exit gases depend on the ratio of the gas recycled to that passed through the heat exchanger and burnt to heat the pebble heater. In general it is preferred to pass 35-70% of the gases leaving the reaction zone to the heat exchanger and thence, after mixing with the required amount of air, to combustion in the pebble heater. A gas mixture containing a proportion of nitrogen in the higher part of the range indicated should be used when the percentage of gas passed through the heat exchanger is also in the higher part of the range indicated in this connection. Similarly, where a smaller quantity of gas is passed to the heat exchanger, for instance a quantity in the neighbourhood of 35% of the gases leaving the reaction chamber, a gas richer in carbon monoxide should be used for feed, for instance one containing 20% or more of carbon monoxide. Where the gas introduced contains more than 20% of carbon monoxide the quantity of exit gas passed to the heat exchanger may even be reduced below 35% of the total available, for example down to 32%. The use of a feed gas having a nitrogen content in the higher part of the range indicated makes it necessary to operate the heat exchanger and pebble heater at higher temperatures than is the case where the feed gas is of lower nitrogen content. Generally the heat exchanger is operated so as to preheat the gas passing through it to 550°-750° C., while the pebble heater is raised to a temperature of more than 1200° C., and where the nitrogen content of the feed gas is in the lower part of the indicated range, it may be necessary for this temperature to approach closely 2000° C. for the gas to be preheated thereby to a temperature suitable for maintenance of the reaction. This temperature may be 1200° C. where the reaction is conducted at say 950°-1000° C. in order to obtain 90% conversion, but may only be 1100° C. or somewhat below this where a lower reaction temperature, e. g. 800°-900° C., is used.

The operation of the process of the invention with solids maintained in the fluidised state is not limited to a process in which the solids travel downwardly against an ascending stream of gases and, indeed, both solids and gases may travel in the same direction and this direction may, if desired, be upwards. Such a process may be operated so that the solids and gases are supplied together to the bottom of the reactor and taken off together at a uniform temperature from the top of the reactor, the mixed products being used for preheating inlet gas being supplied to the reaction zone and being at the same time cooled as far as possible, after which the solids may be allowed to settle out, final separation being effected with the aid of centrifugal separators. Thereafter the gases may be utilised for the generation of heat by burning the carbon monoxide content in a pebble heater, the heat thus stored in the pebble heater being used to heat further the inlet gas already preheated by means of the issuing products. Such a process can be operated quite satisfactorily with a smaller quantity of gases than the process which has been more particularly described above, since it is possible to avoid altogether recycling of the gases. Even here, however, it is preferred to introduce substantially more nitrogen than is theoretically needed for a given output of cyanide, as by this means the reaction is influenced favourably towards the production of sodium cyanide, and it is preferred therefore to use, as above indicated, even under these conditions at least 10 times the theoretical quantity of nitrogen.

While the invention has been described more particularly in connection with the manufacture of sodium cyanide it will be appreciated that it may be applied to the manufacture also of other alkali metal cyanides from the corresponding carbonates, in particular to the manufacture of potassium cyanide or a mixture of sodium and potassium cyanides.

Having described our invention, what we desire to secure by Letters Patent is:

1. Process for the production of alkali metal cyanide by reaction between an alkali metal carbonate, carbon and oxygen-free nitrogen, which comprises carrying out the cyanide forming reaction in a thermally insulated reaction zone while introducing nitrogen therein at a rate at least 10 times as fast as it is used, passing part of the gaseous reaction products issuing from the reaction zone to a combustion zone in which the entering gaseous reaction products containing carbon monoxide produced in the reaction are mixed and burnt with substantially the theoretical quantity of air necessary to react with the carbon monoxide present, venting part of the combustion products and adding the nitrogen content of the remainder to a supply of said gaseous reaction products, preheating gas comprising nitrogen with the heat produced in the aforementioned combustion zone to substantially above the reaction temperature, and introducing the preheated gas into the reaction zone to supply reaction heat to continue the process.

2. Process for the production of an alkali metal cyanide by reaction between an alkali metal carbonate, carbon and nitrogen, which comprises carrying out the cyanide-forming reaction in a thermally insulated reaction zone while feeding the nitrogen therein at least 10 times as fast as it is used and mixed with carbon monoxide, the mixture containing at least 3 times as much nitrogen as carbon monoxide, passing part of the gaseous reaction products issuing from said reaction zone to a combustion zone and burning its carbon monoxide content therein with substantially the theoretical quantity of air, venting part of the combustion products and adding the nitrogen content of the remainder to a supply of said gaseous reaction products and preheating the mixture to a temperature above that maintained in the reaction zone with heat generated in said combustion zone, and passing the preheated mixture into the reaction zone to continue the process.

3. Process for the production of an alkali metal cyanide by reaction between an alkali metal carbonate, carbon and nitrogen, which comprises carrying out the cyanide-forming reaction in a thermally insulated reaction zone while feeding the nitrogen therein at a rate 30 to 50 times that at which it is used and mixed with carbon monoxide, the mixture containing 5 to 20 times as much nitrogen as carbon monoxide, passing part of the gaseous reaction products issuing from said reaction zone to a combustion zone and burning its carbon monoxide content therein with substantially the theoretical quantity of air, venting part of the combustion products and adding the nitrogen content of the remainder to a supply of said gaseous reaction products and preheating the mixture to a temperature above that maintained in the reaction zone with heat generated in said combustion zone, and passing the preheated mixture into the reaction zone to continue the process.

4. Process for the production of an alkali metal cyanide by reaction between an alkali metal carbonate, carbon and nitrogen, which comprises carrying out the cyanide-forming reaction at 800 to 1000° C. in a thermally insulated reaction zone while feeding the nitrogen therein at a rate 30 to 50 times that at which it is used and mixed with carbon monoxide, the mixture containing 5 to 20 times as much nitrogen as carbon monoxide, passing part of the gaseous reaction products issuing from said reaction zone to a combustion zone and burning its carbon monoxide content therein with substantially the theoretical quantity of air, venting part of the combustion products and adding the nitrogen content of the remainder to a supply of said gaseous reaction products and preheating the mixture to 1050 to 1200° C. with heat generated in said combustion zone, and passing the preheated mixture into the reaction zone to continue the process.

5. Process according to claim 4, wherein the solids in the reaction zone are maintained in fluidized form and are continuously passed through the reaction zone in counter-current to the gases.

6. Process according to claim 4, wherein the solids in the reaction zone are passed through the reaction zone in counter-current to the gases, and the gaseous products passed to the combustion zone and the air used in the combustion are preheated by heat exchange with solid product leaving the reaction zone.

7. Process according to claim 6, wherein the solids are maintained in fluidized form.

8. Process for the production of an alkali metal cyanide by reaction between an alkali metal carbonate, carbon and nitrogen, which comprises carrying out the cyanide-forming reaction in a thermally insulated reaction zone while feeding the nitrogen therein at least 10 times as fast as it is used and mixed with carbon monoxide, passing 32 to 70% of the gaseous reaction products issuing from said reaction zone to a combustion zone and burning its carbon monoxide content therein with substantially the theoretical quantity of air, venting part of the combustion products and adding the nitrogen content of the remainder to a supply of said gaseous reaction products and preheating the mixture to a temperature above that maintained in the reaction zone with heat generated in said combustion zone, and passing the preheated mixture into the reaction zone to continue the process.

9. Process for the production of an alkali metal cyanide by reaction between an alkali metal carbonate, carbon and nitrogen, which comprises carrying out the cyanide-forming reaction in a thermally insulated reaction zone while feeding the nitrogen therein at least 10 times as fast as it is used and mixed with carbon monoxide, the mixture containing at least 3 times as much nitrogen as carbon monoxide, passing 32 to 70% of the gaseous reaction products issuing from said reaction zone to a combustion zone and burning its carbon monoxide content therein with substantially the theoretical quantity of air, venting part of the combustion products and adding the nitrogen content of the remainder to a supply of said gaseous reaction products and preheating the mixture to a temperature above that maintained in the reaction zone with heat generated in said combustion zone, and passing the preheated mixture into the reaction zone to continue the process.

10. Process for the production of an alkali metal cyanide by reaction between an alkali metal carbonate, carbon and nitrogen, which comprises carrying out the cyanide-forming reaction at 800 to 1000° C. in a thermally insulated reaction zone while feeding the nitrogen therein at a rate 30 to 50 times that at which it is used and mixed with carbon monoxide, the mixture containing 5 to 20 times as much nitrogen as carbon monoxide, passing 32 to 70% of the gaseous reaction products issuing from said reaction zone to a combustion zone and burning its carbon monoxide content therein with substantially the theoretical quantity of air, venting part of the combustion products and adding the nitrogen content of the remainder to a supply of said gaseous reaction products and preheating the mixture to 1050 to 1200° C. with heat generated in said combustion zone, and passing the preheated mixture into the reaction zone to continue the process.

11. Process according to claim 10, wherein the solids in the reaction zone are maintained in fluidized form and are continuously passed through the reaction zone in counter-current to the gases.

12. Process according to claim 10, wherein the solids in the reaction zone are passed through the reaction zone in countercurrent to the gases, and the gaseous products passed to the combustion zone and the air used in the combustion are preheated by heat exchange with solid product leaving the reaction zone.

13. Process according to claim 12, wherein the solids are maintained in fluidized form.

WALTER HENRY GROOMBRIDGE.
WILLIAM HUNTER.

REFERENCES CITED

The following references are of record in the file of this patent:

UNITED STATES PATENTS

| Number | Name | Date |
|---|---|---|
| 1,120,682 | Bucher | Dec. 15, 1914 |
| 1,298,363 | Lindquist | Mar. 25, 1919 |
| 2,422,791 | Leffer | June 24, 1947 |